United States Patent [19]

Lee et al.

[11] Patent Number: 5,572,454
[45] Date of Patent: Nov. 5, 1996

[54] MODULO REDUCTION METHOD USING A PRECOMPUTED TABLE

[75] Inventors: Yun H. Lee; Chung R. Jang; Myung S. Lee, all of Seoul, Rep. of Korea

[73] Assignee: Korea Telecommunication Authority, Seoul, Rep. of Korea

[21] Appl. No.: 353,266

[22] Filed: Dec. 5, 1994

[30] Foreign Application Priority Data

Dec. 6, 1993 [KR] Rep. of Korea ............... 1993-26632

[51] Int. Cl.$^6$ .................................................. G06F 7/00
[52] U.S. Cl. ................................................ 364/746.1
[58] Field of Search ..................................... 364/746.1

[56] References Cited

U.S. PATENT DOCUMENTS 4,742,479  5/1988  Kloker et al. .
4,870,681  9/1989  Sediak .
4,891,781  1/1990  Omura .
5,210,710  5/1993  Omura .
5,249,148  9/1993  Catherwood et al. .

*Primary Examiner*—Tan V. Mai
*Attorney, Agent, or Firm*—Spencer & Frank

[57] ABSTRACT

A modulo reduction method using a precomputed table to increase a reduction speed during the execution of ordinary operational processes using computers and comprises a first step which searches out with an index of an upper $\log_2 t$ ($t \geq 1$) bit number and adds the value stored in a table to a lower $n$ ($n \geq 512$) bit number; a second step, which if the result, obtained from the addition of said lower n bit number to the number searched out from the table at said first step, produces an overflow (1 bit), eliminates said overflow and finishes the execution of an operation; and a third step, which if said overlow does not occur at said second step, adds $_N$ on a modulo N to the result obtained from said first step and finishes the execution of the operation.

3 Claims, 3 Drawing Sheets

MODULO REDUCTION METHOD USING A PRECOMPUTED TABLE

BACKGROUND OF THE INVENTION

1. Field of the Invention

The present invent ion relates to a modulo reduction method using a precomputed table to increase a reduction speed by reducing the number of addition operations during the execution of ordinary operational processes using computers.

2. Description of the Prior Art

The recent increasing need for information protection has brought to us the need of implementation of a mechanism for information protection, whose characteristics requires modulo arithmetic of very large numbers. Particularly, the need of high speed modulo reduction algorithms has increased in proportion to the increasing need of involution operations.

Most information protection mechanisms need to be implemented on smart cards under various limited operational conditions, in terms of the size of the memory and the speed of processors, or the like, used on the smart cards.

For this reason, we can consider operational techniques, which use a precomputed table stored in an appropriate size of a memory, to convert all of the muliplications needed for reduction operations into additions. Conventional reduction techniques have drawbacks in that they require many operations and are not efficient.

Modulo arithmetic refers to an operation that obtains a remainder from the division of a number X, which is greater than N by N, for a given modulo N. Modulo arithmetic used in an information protection mechanism, where N is an ordinary number having more than 512 bits, which can not be handled at one time, requires a multi-precision operation.

The most essential part of a modulo operation method or algorithm is the part which performs the modulo arithmetic. There are, in general, two methods for performing a modulo reduction. One is a method that uses real division in performing a reduction, the other is the method that uses addition only, i.e., not division. The method that uses division does not need to use a precomputed table, while the method which does not use division needs a precomputed table.

Conventional modulo reduction algorithms using precomputed tables can be explained with references to FIG. 1, FIG. 2, and FIG. 3. as follows:

FIG. 1 shows a table configuration used in conventional modulo reduction algorithms; FIG. 2 illustrates a structure for inputting data into a modulo reduction algorithm; and FIG. 3 shows a flow of a modulo reduction algorithm using a table.

In this application, X represents an input ($2^n \leq X < 2^n + \log_2 t$), $X\_R$ an upper $\log_2 t$ bit number of X, $X\_R$ a lower n bit number of X and N also modulo, respectively.

The reference number 1, in FIG. 1, represents the ith content ($1 \leq i \leq t-1$) stored in the table, the number 2, in FIG. 2, represents an upper (r-n) bit of the reference number, which consists of maximum r bits ($n < r \leq n + \log_2 t$), and is to be reduced, and the number 3 represents a lower n bits, which need not be reduced respectively, while the number 4, in FIG. 3, represents a modulo reduction process of a conventional algorithm, and the number 5 represents the checking of an overflow.

Letting N be an n bit number, an algorithm using the conventional table will operate as shown in FIG. 3. First, assume a number, which is constructed as shown in FIG. 2, is to be inputted. Let the inputted number be X where X can be divided such that $X = X\_0 \cdot 2^2 + X\_R$, and with reference to the n bit, such that $X(\bmod N) = (X\_0 \cdot 2^n (\bmod N) + X\_R)(\bmod N)$. Here, the results stored previously in the table, as shown in FIG. 1, can be searched for with an index of $X\_0 \cdot 2^n(\bmod N)$. The $X\_0 \cdot 2^n(\bmod N)$ found in this way can be added to $X\_R$ to make a new X'. In this case, an overflow bit can occur in the (n+1)th bit, since $X\_0 \cdot 2^n(\bmod N)$ and $X\_R$ are maximum n bit numbers respectively. If an overflow occurs, the above process will be repeated with the X' being inputted. If not, the reduction process will be finished. However, a subtraction may be needed after comparing the final result with N, since the final result can be greater than N, even though it has n bits.

As explained above, the Prior Art requires repetition of the reduction process, which refers to the table, when overflows occur. Since the maximum number of times an execution of the reduction process is not fixed, there exists a problem in that the reduction operation has to be executed many times.

SUMMARY OF THE INVENTION

To provide a method which can increase the reduction speed by reducing the number of addition operations and, at the same time, the number of executions for an average addition operation, by fixing the number of addition operations at 2 times for one time of the execution of the reduction algorithm. The present invention comprises a first step, which searches out an index of an upper bit number and adds the value stored in the table to a lower bit number; a second step, which if the result obtained from the addition of said lower bit number to the number searched out from the table at said first step produces an overflow (1 bit), eliminates said overflow and finishes the execution of the operation; and a third step, which if said overlow does not occur at said second step, adds N on a modulo N to the result obtained form said first step and finishes the execution of the operation.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 4:
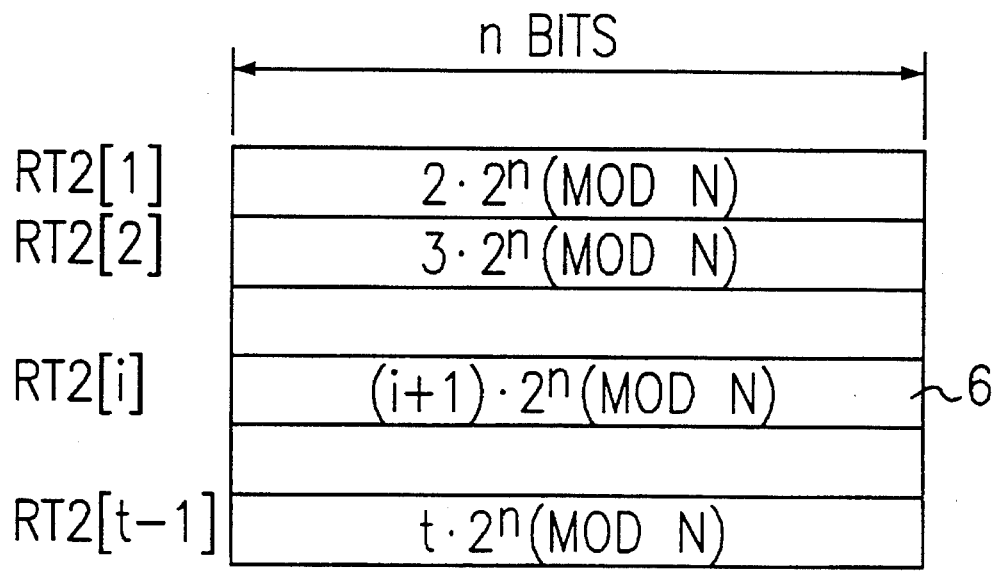
FIG. 4 shows the content stored in a table which is used in the present invention.

FIG. 4 shows the content stored in a table which is used in the present invention. Index values range from 1 to t−1 (RT2[1] to RT2[t−1]), each content has n (e.g., $n \geq 512$) bits.

Figure 1:
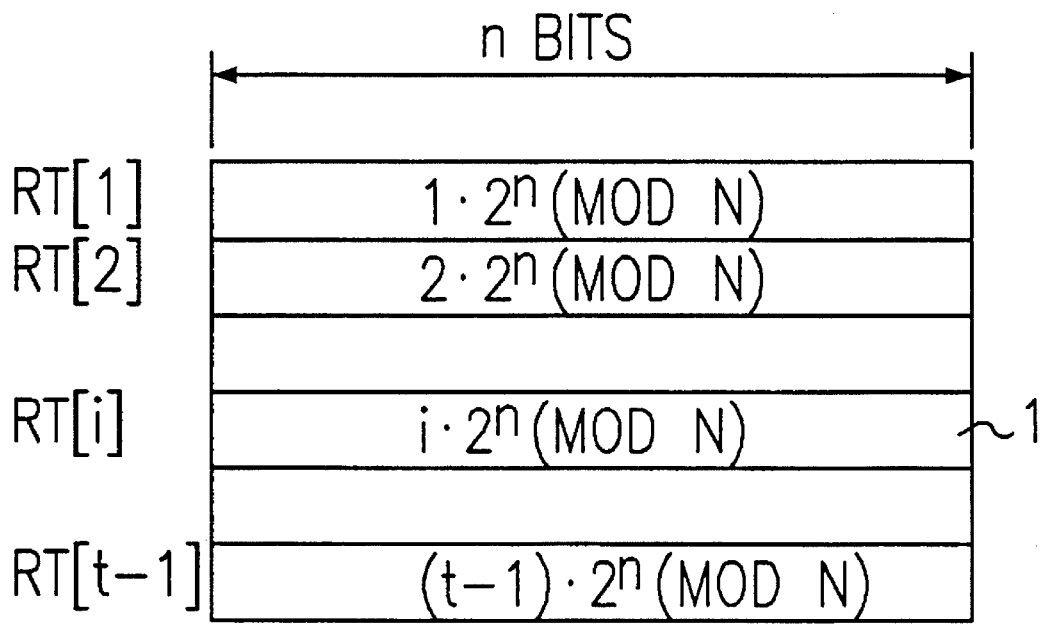
FIG. 1 shows a table configuration used in conventional modulo reduction algorithms.
Figure 2:
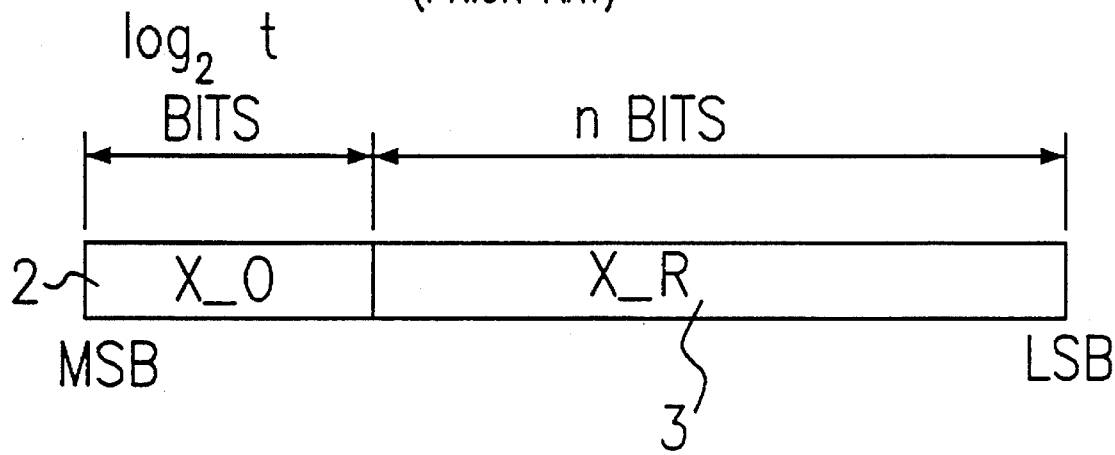
FIG. 2 illustrates a structure for inputting data into a modulo reduction algorithm.
Figure 3:
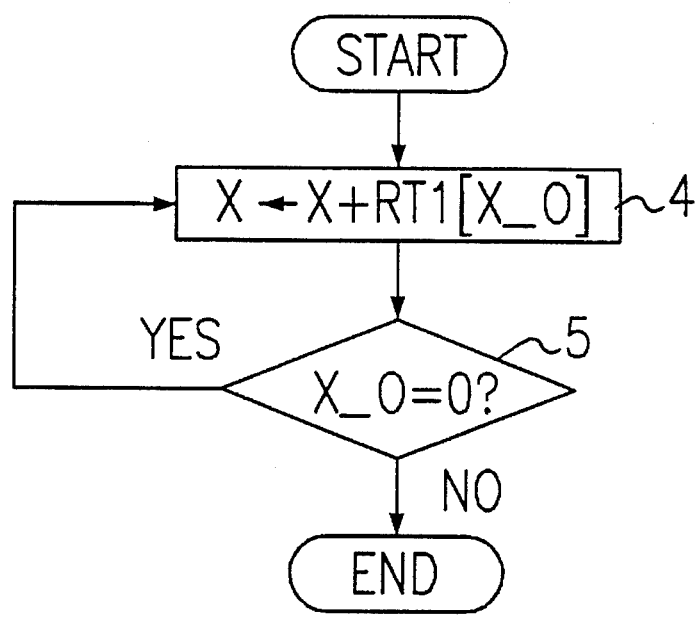
FIG. 3 shows a flow of a modulo reduction algorithm using a table.

It should be noted that the value to be stored in an index i is $(i+1)\cdot 2^n \pmod N$. Provided that n is 512 bits and t is 16 to 32 bits, the size of the table is about 1 kbytes to 2 kbytes. The reference number 6 represents the ith ($1 \leq i \leq t-1$) content stored in the table, which is used in the reduction method or algorithm according to the present invention. The structure of the input data, which is used for the reduction algorithm proposed in the present invention, is the same as shown in FIG. 2, where X is composed of more than n bits and its maximum size is $n+\log_2 t$ bits.

Figure 5:
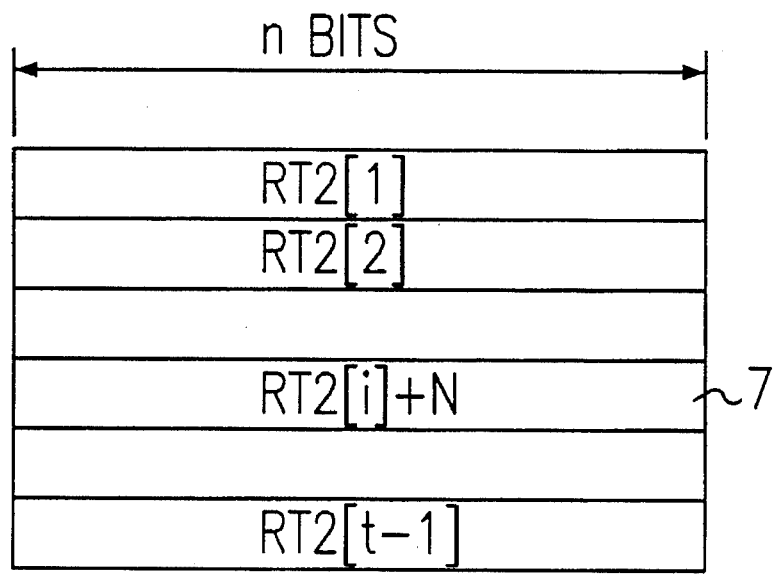
FIG. 5 shows an optimization process for the table shown in FIG. 4.

FIG. 5 shows an optimization of the table shown in FIG. 4. The optimization here involves a process where, if the content of the table is a number smaller than $2^n - N$, N is added to it, that is, a process for making an overflow occur faster by making MSB become 1, if possible. Adding N here does not induce any influence upon its results, according to the laws of modulo arithmetic and only makes the overflow occur faster.

In FIG. 5, the reference number 7 shows the process in which RT2[i]+N, is stored instead of RT2[i], when RT2[i] $+N<2^n$.

Figure 6:
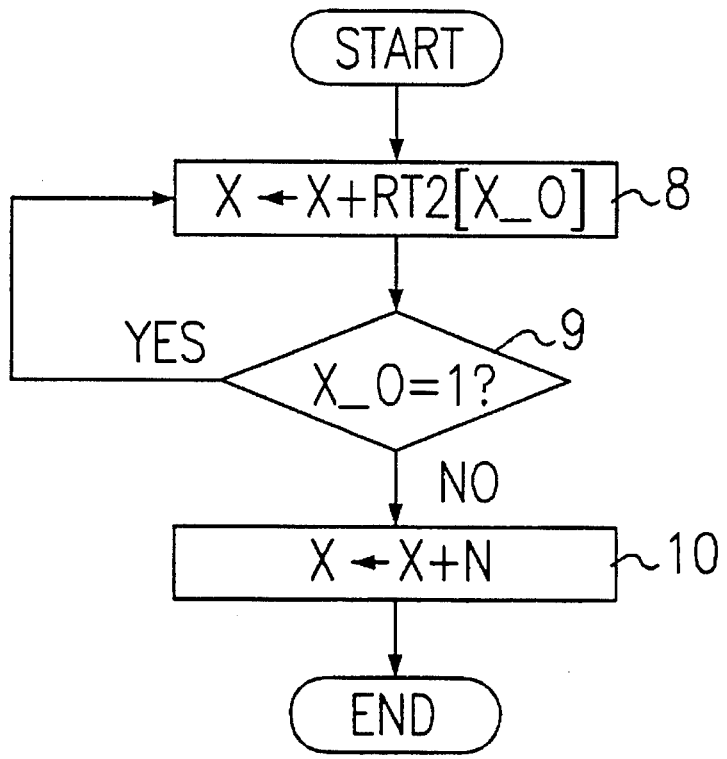
FIG. 6 shows a configuration of the reduction algorithm proposed in the present invention.

FIG. 6 shows a flow chart of the reduction algorithm proposed in the present invention. In FIG. 6, the reference number 8 is a the first reduction process step of the reduction algorithm proposed in the present invention, reference number 9 is a step for checking whether an overflow occurs or not, and reference number 10 is a further the reduction process step, which comes after the first reduction process step 8.

First, in step 8 the value stored in the table needs to be searched for with an index of X_O, which is an upper $\log_2 t$ bit number, and then added to a lower n bit number. However, the stored value should be subtracted by $2^n$, since it is a value corresponding to a $\log_2 t$ bit number +1. When the result of the adddition of the lower n bit number to the number searched for in the table has produced an overflow (1bit), the algorithm should be finished, since neglecting the overflow is the same as subtracting $2^n$.

If an overflow has not occured here (step 9), the algorithm should be finished, after adding N (step 10). The result should not be affected by adding N here, because its the same as adding 0 to (mod N). Adding N will produce an overflow, since the table is already optimized as described above. Therefore, the maximum number of operations in the proposed algorithm will not exceed 2 times.

<The first embodiment of the present invention>

The result of the comparison made by applying a conventional reduction algorithm and this reduction algorithm is as follows; The major operations of the reduction operation using the precomputed table are additions, and the times of the additions are compared in the following results.

[1]the results producing and testing 300random moduli Ns (1) probability that the proposed algorithm is superior to the conventional one: 76%(228 times/300 times)

Note-①:B=A(mod N) in this operation

②:A is the random number of 1024 bits, and N is the random number of 512 bits.

③:B=A(mod N) is operated by 100 times for one N

④:the number of table contents is 32

(2) the number of addition operations used at one time in the reduction operation when this algorithm is superior to the conventional one: 134.32 additions/reduction (3) the number of addition operations used at one time in the reduction operation when the conventional is superior to this: 137.53 additions/reduction In table, "*" means the case where the conventional method is superior.

| No. | Proposed Algorithm | Conventional Algorithm | Status (+/−) |
|---|---|---|---|
| 1 | 1,352,500 | 1,389,282 | +36,782 |
| 2 | 1,270,959 | 1,297,347 | +26,388 |
| 3 | 1,392,805 | 1,411,866 | +19,061 |
| 4 | 1,328,5Z7 | 1,350,030 | +21,503 |
| 5 | 1,240,833 | 1,291,009 | +50,176 |
| 6 | 1,341,579 | 1,386,072 | +44,493 |
| 7 | 1,385,147 | 1,417,932 | +32,785 |
| 8 | 1,322,977 | 1,367,321 | +44,344 |
| 9 | 1,233,809 | 1,369,281 | +135,472 |
| 10 | 1,500,023 | 1,439,361 | −60,662* |
| 11 | 1,556,986 | 1,446,919 | −110,067* |
| 12 | 1,031,995 | 1,494,389 | +462,394 |
| 13 | 1,391,801 | 1,385,068 | +6,733 |
| 14 | 1,869,304 | 1,124,769 | −741,335* |
| 15 | 1,328,821 | 1,386,180 | +57,359 |
| 16 | 1,384,342 | 1,492,727 | +108,385 |
| 17 | 1,431,188 | 1,499,430 | +68,242 |
| 18 | 1,268,503 | 1,308,922 | +40,419 |
| 19 | 1,392,834 | 1,449,149 | +56,315 |
| 20 | 1,358,019 | 1,316,865 | −41,154* |
| 21 | 1,685,774 | 1,321,166 | −364,653* |
| 22 | 1,450,890 | 1,422,326 | −28,564* |
| 23 | 1,397,291 | 1,334,196 | −63,097* |
| 24 | 1,299,832 | 1,362,249 | +62,417 |
| 25 | 1,242,391 | 1,351,493 | +109,162 |
| 26 | 1,421,763 | 1,522,124 | +100,388 |
| 27 | 1,409,829 | 1,420,723 | +10,894 |
| 28 | 1,310,560 | 1,350,715 | +40,155 |
| 29 | 1,699,823 | 1,304,909 | −394,914* |
| 30 | 1,223,574 | 1,302,423 | +78,849 |
| 31 | 1,391,700 | 1,406,007 | +14,307 |
| 32 | 1,431,471 | 1,487,634 | +56,163 |
| 33 | 1,470,137 | 1,462,661 | −7,476* |
| 34 | 1,323,150 | 1,355,076 | +31,926 |
| 35 | 1,619,725 | 1,390,006 | −229,719* |
| 36 | 1,766,667 | 1,234,038 | −532,629* |
| 37 | 1,324,599 | 1,373,810 | +49,211 |
| 38 | 1,287,884 | 1,297,056 | +9,172 |
| 39 | 1,299,470 | 1,325,298 | +25,828 |
| 40 | 1,420,875 | 1,504,611 | +83,736 |
| 41 | 1,405,382 | 1,442,362 | +36,983 |
| 42 | 1,385,644 | 1,413,467 | +27,823 |
| 43 | 1,296,608 | 1,319,600 | +22,992 |
| 44 | 1,296,700 | 1,348,170 | +51,470 |
| 45 | 1,501,683 | 1,515,284 | +13,601 |
| 46 | 1,439,636 | 1,540,350 | +100,714 |
| 47 | 1,266,269 | 1,346,061 | +79,792 |
| 48 | 1,328,022 | 1,405,252 | +77,230 |
| 49 | 1,343,236 | 1,403,986 | +60,750 |
| 50 | 1,385,549 | 1,357,969 | −27,580* |
|  |  |  | +214,703 |
|  |  |  | +4,294/1 time |

<The analysis of the results>

In the case where both the conventional reduction algorithm and the reduction algorithm, of the present invention, have table contents of 32, and are executed at their fastest speed, the number of addition operations will be 103 in reduction of a 1024 bit number.

$$\left( \left[ \frac{512}{\log_2 32} \right] + 1 = 103 \right)$$

From the above results, there is a 76% probability that the proposed algorithm is superior to the conventional one for an arbitrary N. Also, in the case where the conventional one is better, an average of 137.53 additions are required.

<The second embodiment of the present invention>

The second embodiment of the present invention is the result of the execution of 10,000 reductions for a fixed N. The proposed algorithm needed 1,268,663 addition operations for the execution of 10,000 reductions, while the conventional algorithm needed 1,315,858 addition operations for the execution of 10,000 reductions.

| No. | Proposed Algorithm | Conventional Algorithm | Status | |
|---|---|---|---|---|
| 1 | 12683 | 13207 | YES: | 524 |
| 2 | 12703 | 13202 | YES: | 499 |
| 3 | 12610 | 13091 | YES: | 451 |
| 4 | 12689 | 13150 | YES: | 461 |
| 5 | 12639 | 13202 | YES: | 563 |
| SUBTOTAL: | 63354 additions | 65852 additions | + | 2498 |
| 6 | 12799 | 13144 | YES: | 345 |
| 7 | 12618 | 13167 | YES: | 549 |
| 8 | 12753 | 13227 | YES: | 474 |
| 9 | 12737 | 13078 | YES: | 341 |
| 10 | 12713 | 13194 | YES: | 481 |
| SUBTOTAL: | 126974 additions | 131662 additions | + | 4688 |
| 11 | 12669 | 13105 | YES: | 436 |
| 12 | 12683 | 13186 | YES: | 497 |
| 13 | 12632 | 13067 | YES: | 435 |
| 14 | 12719 | 13160 | YES: | 441 |
| 15 | 12592 | 13151 | YES: | 559 |
| SUBTOTAL: | 190269 additions | 197325 additions | + | 7056 |
| 16 | 12586 | 13174 | YES: | 588 |
| 17 | 12696 | 13188 | YES: | 492 |
| 18 | 12665 | 13164 | YES: | 499 |
| 19 | 12671 | 13204 | YES: | 533 |
| 20 | 12711 | 13208 | YES: | 497 |
| SUBTOTAL: | 253598 additions | 263263 additions | + | 9665 |
| 21 | 12721 | 1.3231 | YES: | 510 |
| 22 | 12718 | 13168 | YES: | 450 |
| 23 | 12702 | 13158 | YES: | 456 |
| 24 | 12669 | 13091 | YES: | 422 |
| 25 | 12748 | 13197 | YES: | 449 |
| SUBTOTAL: | 317156 additions | 329108 additions | + | 11952 |
| 26 | 12608 | 13223 | YES: | 615 |
| 27 | 127751 | 13146 | YES: | 395 |
| 28 | 12616 | 13140 | YES: | 524 |
| 29 | 12682 | 13117 | YES: | 435 |
| 30 | 12690 | 13230 | YES: | 540 |
| SUBTOTAL: | 380503 additions | 394964 additions | + | 14461 |
| 31 | 12712 | 13092 | YES: | 380 |
| 32 | 12674 | 13190 | YES: | 516 |
| 33 | 12683 | 13206 | YES: | 523 |
| 34 | 12689 | 13141 | YES: | 452 |
| 35 | 12667 | 13179 | YES: | 512 |
| SUBTOTAL: | 443923 additions | 460772 additions | + | 16844 |
| 36 | 12634 | 13060 | YES: | 426 |
| 37 | 12600 | 13270 | YES: | 670 |
| 38 | 12666 | 13138 | YES: | 472 |
| 39 | 12663 | 13114 | YES: | 451 |
| 40 | 12744 | 13138 | YES: | 394 |
| SUBTOTAL: | 507235 additions | 526492 additions | + | 19257 |
| 41 | 12686 | 13144 | YES: | 458 |
| 42 | 12683 | 13110 | YES: | 427 |
| 43 | 12788 | 13153 | YES: | 365 |
| 44 | 12648 | 13116 | YES: | 468 |
| 45 | 12614 | 13133 | YES: | 519 |
| SUBTOTAL: | 507654 additions | 592148 additions | + | 21494 |
| 46 | 12724 | 13164 | YES: | 440 |
| 47 | 12682 | 13161 | YES: | 479 |
| 48 | 12669 | 13210 | YES: | 541 |
| 49 | 12709 | 13120 | YES: | 411 |
| 50 | 12808 | 13154 | YES: | 346 |
| SUBTOTAL: | 634246 additions | 657957 additions | + | 23711 |
| 51 | 12792 | 13182 | YES: | 390 |
| 52 | 12722 | 13099 | YES: | 377 |
| 53 | 12705 | 13133 | YES: | 428 |
| 54 | 12710 | 13188 | YES: | 478 |
| 55 | 12656 | 13204 | YES: | 548 |
| SUBTOTAL: | 697831 additions | 723763 additions | + | 25932 |
| 56 | 12674 | 13136 | YES: | 462 |
| 57 | 12687 | 13114 | YES: | 427 |
| 58 | 12671 | 13097 | YES: | 426 |
| 59 | 12688 | 13124 | YES: | 436 |
| 60 | 12715 | 13153 | YES: | 438 |
| SUBTOTAL: | 761266 additions | 789387 additions | + | 28121 |
| 61 | 12674 | 13212 | YES: | 538 |
| 62 | 12663 | 13120 | YES: | 457 |
| 63 | 12704 | 13160 | YES: | 456 |
| 64 | 12636 | 13184 | YES: | 548 |
| 65 | 12700 | 13197 | YES: | 497 |
| SUBTOTAL: | 824643 additions | 855260 additions | + | 30617 |

-continued

| No. | Proposed Algorithm | Conventional Algorithm | Status | |
|---|---|---|---|---|
| 66 | 12709 | 13114 | YES: | 405 |
| 67 | 12684 | 13145 | YES: | 461 |
| 68 | 12698 | 13134 | YES: | 436 |
| 69 | 12678 | 13157 | YES: | 479 |
| 70 | 12617 | 13184 | YES: | 567 |
| SUBTOTAL: | 888029 additions | 920994 additions | + | 32965 |
| 71 | 12680 | 13063 | YES: | 383 |
| 72 | 12732 | 13132 | YES: | 400 |
| 73 | 12722 | 13108 | YES: | 385 |
| 74 | 12726 | 13127 | YES: | 401 |
| 75 | 12730 | 13230 | YES: | 500 |
| SUBTOTAL: | 951619 additions | 986654 additions | + | 35035 |
| 76 | 12704 | 13171 | YES: | 467 |
| 77 | 12609 | 13198 | YES: | 589 |
| 78 | 12668 | 13217 | YES: | 549 |
| 79 | 12630 | 13219 | YES: | 589 |
| 80 | 12698 | 13193 | YES: | 495 |
| SUBTOTAL: | 1014928 additions | 1052652 additions | + | 37724 |
| 81 | 12681 | 13177 | YES: | 496 |
| 82 | 12667 | 13128 | YES: | 461 |
| 83 | 12735 | 13122 | YES: | 387 |
| 84 | 12586 | 13128 | YES: | 542 |
| 85 | 12738 | 13169 | YES: | 431 |
| SUBTOTAL: | 1078335 additions | 1118376 additions | + | 40041 |
| 86 | 12806 | 13178 | YES: | 372 |
| 87 | 12617 | 13214 | YES: | 597 |
| 88 | 12759 | 13185 | YES: | 426 |
| 89 | 12663 | 13129 | YES: | 466 |
| 90 | 12733 | 13117 | YES: | 384 |
| SUBTOTAL: | 1141913 additions | 1184199 additions | + | 42286 |
| 91 | 12766 | 13179 | YES: | 413 |
| 92 | 12732 | 13212 | YES: | 480 |
| 93 | 12690 | 13212 | YES: | 522 |
| 94 | 12652 | 13184 | YES: | 532 |
| 95 | 12635 | 13084 | YES: | 449 |
| SUBTOTAL: | 1205388 additions | 1250070 additions | + | 44682 |
| 96 | 12757 | 13167 | YES: | 410 |
| 97 | 12587 | 13135 | YES: | 548 |
| 98 | 12642 | 13192 | YES: | 550 |
| 99 | 12654 | 13159 | YES: | 505 |
| 100 | 12635 | 13135 | YES: | 500 |
| SUBTOTAL: | 1268663 additions | 1315858 additions | + | 47195 |

<The analysis of the results>

In the case where both the conventional reduction algorithm and the reduction algorithm, of the present invention, are executed at their fastest speeds, the number of n bit addition operations will be 1 when the reduction algorithm is being called up one time. Accordingly, more than 10,300 n bit addition operations will be executed, since calling up the reduction algorithm for each number of the embodiment of the present invention is 10,3000 times.

The embodiment of the present invention shows the superiority of the algorithm of the present invention for most of the N's produced arbitrarily.

Once N has been determined, it will be used characteristically for a considerable amount of time. N will be replaced only when N is the product of two prime numbers, which are more than 256 bits, and when the information on the prime factor resolution of N is known. However, if N is more than 512 bits, N would be considered safe and not have to be replaced periodically.

76% is the probability that the proposed algorithm is superior to the conventional one for an arbitrary N. Accordingly, it can be safely said that the proposed algorithm is better than the conventional one.

The above second embodiment is the result of the execution of 10,000 reductions for any fixed N. It has been proven that for such fixed N one of the two algorithm is faster than the other for almost all cases.

As mentioned above, the present invention has an advantage of executing reduction operations at a higher speed, in comparison to a conventional reduction algorithm using the same size precomputed table, as the conventional one, by reducing the number of addition operations during a modulo reduction operation.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A computer implemented method for modulo reduction of a first integer having k bits, larger than a second integer having n bits, the computer storing a precomputed table of numbers in memory, the method comprising:

(a) searching the precomputed table of values stored in memory with the computer for a stored upper k-n bits number of the first integer, and adding the stored upper k-n bits number of the first integer to a lower n bits number of the first integer with the computer;

(b) if the addition of the stored upper k-n bits number of the first integer with the lower n bits number of the first integer in step (a) produces an overflow, eliminating the overflow with the computer; and (c) if the addition of the stored upper k-n bits number of the first integer with the lower n bits number of the first integer in step (a) does not produce an overflow, adding the second integer to the result of the addition in step (a) with the computer.

2. The computer implemented method for modulo reduction according to claim 1, wherein the precomputed table stored in memory is addressed by an address X_O having k-n bits, the precomputed table being constructed with the computer using the following steps:

(1) setting an initial value of X_O to 1 with the computer;

(2) setting the number stored in the table with an address of X_O to $RT[X\_O]=(X\_O+1)\times 2^n$ mode N with the computer;

(3) incrementing X_O by 1 with the computer; and (4) repeating steps (2) and (3) while $X\_O \leq 2^{k-n}-1$ with the computer.

3. The computer implemented method for modulo reduction according to claim 2, wherein in constructing the table, if $RT[X\_O]+N<2^n$, then using $RT[X\_O]=((X\_O+1)\times 2^n \bmod N)+N$ for all X_O with the computer.

* * * * *